C. W. JEFFERSON.
APPARATUS FOR DISTRIBUTING AND LEVELING PIECES OR SCALES OF MICA OR OTHER MATERIAL.
APPLICATION FILED JULY 29, 1908.
1,026,986.
Patented May 21, 1912.
2 SHEETS—SHEET 2.
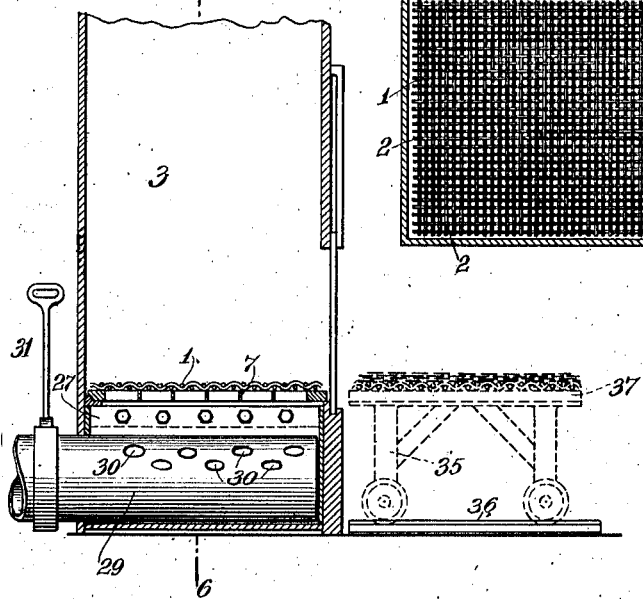
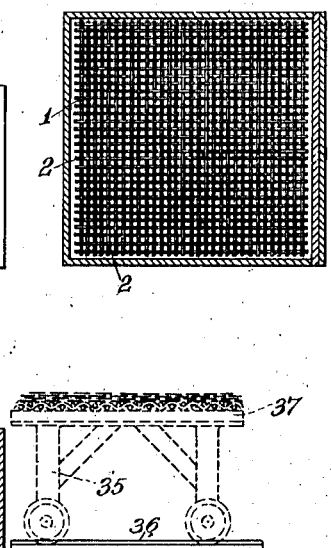
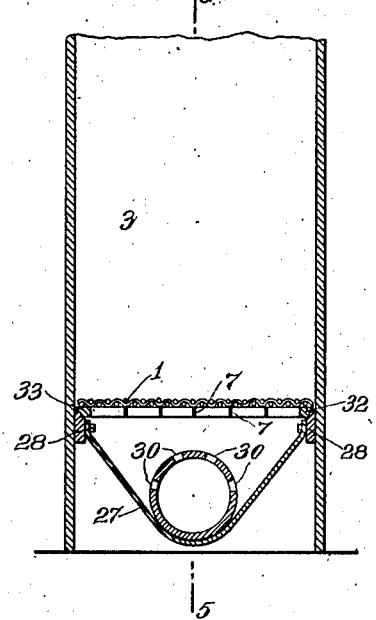
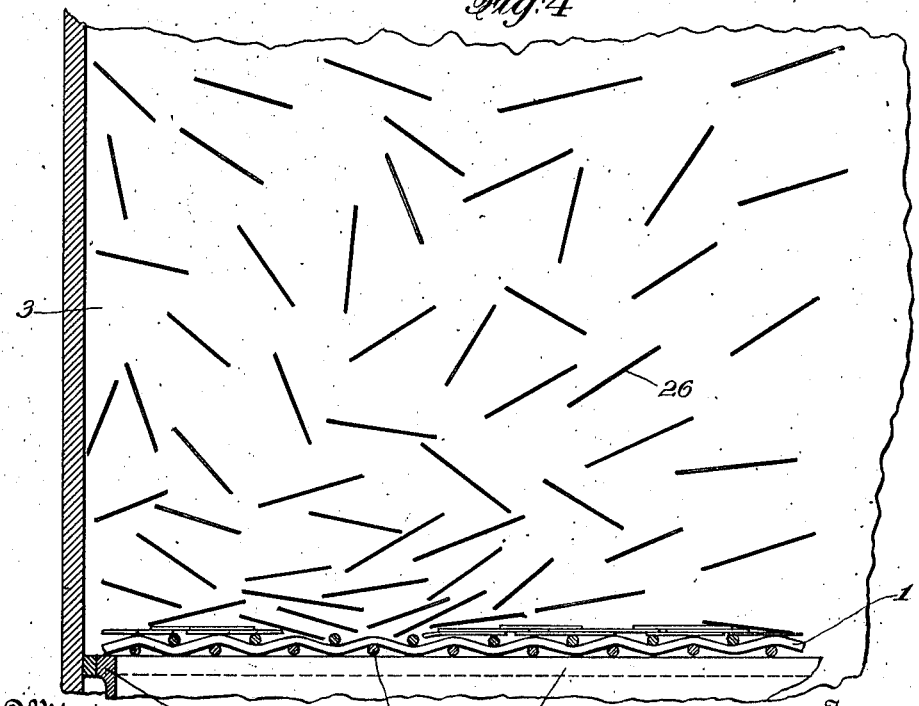

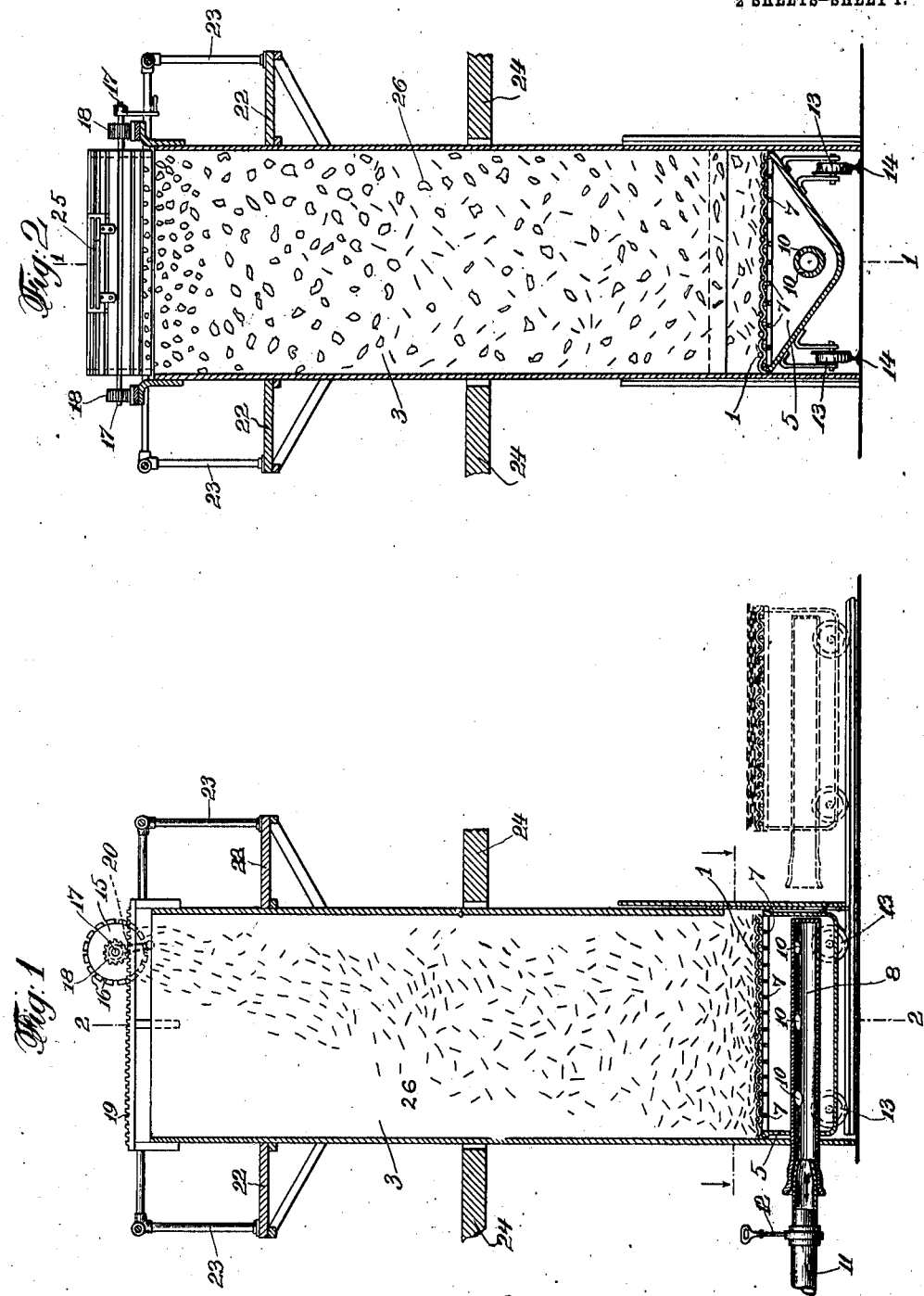

UNITED STATES PATENT OFFICE.

CHARLES W. JEFFERSON, OF SCHENECTADY, NEW YORK, ASSIGNOR TO MICA INSULATOR COMPANY, OF NEW YORK, N. Y., A CORPORATION OF NEW JERSEY.

APPARATUS FOR DISTRIBUTING AND LEVELING PIECES OR SCALES OF MICA OR OTHER MATERIAL.

1,026,986.          Specification of Letters Patent.          Patented May 21, 1912.

Application filed July 29, 1908. Serial No. 446,011.

*To all whom it may concern:*

Be it known that I, CHARLES W. JEFFERSON, a subject of the King of Great Britain, and a resident of the city of Schenectady, county of Schenectady, and State of New York, have invented a new and Improved Apparatus for Distributing and Leveling Pieces or Scales of Mica or other Material, of which the following is a specification.

My invention relates to means for distributing pieces or scales of light material, such as thin pieces of mica.

My invention is particularly adapted for evenly distributing and leveling such scales or pieces upon a substantially horizontal bed or support to any depth or thickness desired, and so that said distributed and leveled scales, while on said support may be subjected to further treatment.

The object of my invention is to automatically, quickly and by simple means, bring about the above result, no matter what the quantity of scales or pieces it is desired to distribute and level.

The accompanying drawings show one embodiment of my invention, in which—

Figure 1 is a vertical section of the apparatus and is taken on the line 1—1 of Fig. 2. Fig. 2 is a similar section in the line 2—2 of Fig. 1. Fig. 3 is a plan of the openwork support for the pieces or scales, as shown in the preceding figures. Fig. 4 is a sectional detail enlarged of a part of said support and one wall of its inclosing shaft, and showing the manner in which the pieces or scales become distributed and leveled. Figs. 5 and 6 are detail views of a slight modification of the apparatus shown in the other figures, Fig. 5, being a section on the line 5—5 of Fig. 6, and Fig. 6 being a section on the line 6—6 of Fig. 5.

Similar characters represent like parts in all the figures.

The support for the scales or pieces to be leveled is pervious to air or other aeriform agent. In the drawings, said support 1 is of woven form and preferably of comparatively thick wires and having a wide mesh. The wires 2 (see Fig. 4) should also be thick enough to form an irregular bearing surface for the scales or pieces, and so that the aeriform agent would act more upon the pieces or scales to distribute and level them, where said agent had a freer passage, and met with the least resistance.

3 is a vertical shaft having closed and preferably air tight walls, and this shaft is provided with a door 4 at its bottom.

5 is a car, on the top of which is the support 1. This car preferably is in the form of a box, which has two of its opposite sides 6 declining inward, as shown in Fig. 2.

The support 1 rests on slats 7, said slats being only near enough together to keep the support in a substantially horizontal position, and leaving ample space between them for the passage of the aeriform agent.

8 is a pipe extending in the car 5 above the line of the apex of the sides 6 of said car, and having one end closed, the other end extending out as at 9 beyond the car, and through one of the walls of the shaft 3, as shown in Fig. 1. The pipe 8 is provided with a lateral opening or openings 10, and the extension 9 is adapted for connection with the inlet pipe 11 of an exhaust apparatus (not shown), said pipe 11 being provided with a valve or cock 12. Any air tight connection between the two pipes 9 and 11 may be used, but I have shown in Fig. 1 a spring connection for said pipes, the end of the pipe 9 springing over the end of the pipe 11.

13 are the wheels of the car 5, which ride on the rails 14 that extend within the shaft 3 and beyond the same, so that the car may be readily drawn into the shaft or drawn out of the same.

15 is a hollow drum or cylinder extending across the top of the shaft 3 and provided with longitudinal openings or slots 16 in its periphery. These slots may be formed by separations between longitudinal slats as shown in the drawings. To the journals 17 of the drum are secured pinions 18, and these pinions engage with and ride upon parallel racks 19 on opposite sides of the shaft 3. This construction provides means by which the drum 15 may be rotated across the top of the shaft. Any means may be employed for turning said drum, but I have shown in the drawings a crank 20 for this purpose, secured to one of the journals 17. For the convenience of the operator or operators a platform 22 extends around the shaft 3 near its top, so that an operator can walk along said platform 22 and rotate the drum 15 over the top of the shaft. I have also provided a safety railing 23 to the platform 22. In order to give security to the walls of the shaft 3, side braces 24 are provided for said walls.

When my improved method is to be used for distributing and leveling flakes or thin pieces of mica upon a horizontal support for further treatment of the mica scales, as for example, to unite said distributed and leveled scales in a homogeneous mass or plate for insulation, the thin scales or pieces of mica, usually from two inches to three inches in diameter, are placed in the drum 15. Any means may be employed for the insertion of said scales or pieces, as for example, by means of a door 25. This door, of course, should be closed after the insertion of the scales or pieces. A predetermined amount of said scales or pieces which it is required to distribute and level on the horizontal support, should be placed in the drum or cylinder 15. The width of the slots 16 in the drum 15 permit the scales or pieces of mica to drop out of the drum when it is rotated, and by such rotation the scales in the drum are agitated. The width of the slots 16 may vary according to the size of the scales or pieces. The car 5 should be rolled into the shaft 3 as shown in Figs. 1 and 2, the door 4 closed, and the connection made between the extension 9 of the pipe 8 and the pipe 11. The support or platform 1 on the top of the car is made of coarse woven wire, the meshes of which are preferably coarse, say, of the width of about one quarter to one half of an inch. This construction will make an irregular upper surface caused by the undulation of the weaving of the wires as is clearly shown in Fig. 4. The exhaust is then put into operation, causing the air to be sucked down through the shaft 3, through the support 1 and the pipes 8 and 11. During this suction or operation of the exhaust, the drum or cylinder 15 is rotated back and forth across the top of the shaft 3, and its rotation is continued until all the scales have dropped out of the drum. In Figs. 1, 2 and 4 the scales are shown at 26 dropping down through the shaft 3 and upon the support 1, Fig. 4 indicating the manner in which the scales are distributed and leveled upon said support, wherein it will be seen that wherever there is a space for the passage of the air, the scales are drawn in greater numbers, and these will be the parts where the greatest positive action is exerted upon the scales.

By this action the scales will be automatically distributed and leveled on the support for wherever there is more opportunity for the air to pass through the support 1 than at other points of the support, there will be fewer scales, and more will be drawn there to cause a continuous level surface of scales over the support. The irregular surface of the support 1 will prevent the scales from entirely closing up the transverse openings of the support 1, and, therefore, permit a full and complete distribution and leveling of the scales on the support. After all the scales have fallen from the drum 15 and been distributed and leveled on the support 1 as described, the exhaust can be shut off by closing the valve 12, the door 4 of the shaft opened, and the car 5 drawn from the shaft with the distributed and leveled scales thereon, as shown in dotted lines in Fig. 1.

Instead of the box with inwardly declined sides constituting a car, a similar box 27 is secured within the shaft 3, as shown in Figs. 5 and 6, the sides of said box being bolted or otherwise fastened to a supporting frame 28. The suction pipe 29 is stationary, its part having the closed end and lateral openings 30 passing through a wall of the shaft 3 within the box 27, and provided with a valve or cock 31 outside said shaft. The slats 7 bearing the support 1, are secured to a frame 32 which removably rests upon the fixed frame 28, and said frame is preferably provided with parallel guide ways 33 on two of its opposite sides, to enable the support 1, 7 to be slid onto and away from the frame 28, a door 34 in a wall of the shaft permitting the insertion in and withdrawal from the shaft of said support. An ordinary platform car 35 with its rails 36 extending to the side of the shaft 3 (having the door 34) and with the upper surface of its platform 37 about on a plane with the guiding surface of the frame 33, permits the platform 1, 7 bearing the distributed and leveled pieces or scales of being drawn out from the shaft 3 onto the car 35, and then transported wherever desired.

The application of my apparatus is not limited to the distribution of mica scales or pieces, as it may be used for the distribution and leveling of small light pieces of other material. Moreover, my invention is not limited to the precise construction shown and described, as it is evident that many changes may be made therein without departing from the spirit of my invention or sacrificing its advantages.

What I claim as new and desire to secure by Letters Patent is:

1. An apparatus for distributing pieces or scales of mica or other material, comprising a vertical shaft with closed walls, a support arranged transversely in said shaft and pervious to an aeriform agent, an exhaust pipe arranged below said support in said passageway and provided with an inlet, and a hollow cylinder provided with openings in its periphery and extending across and adapted to rotate over the top of the shaft.

2. An apparatus for distributing pieces or scales of mica or other material, comprising a vertical shaft with closed walls, a support arranged transversely in said shaft and pervious to an aeriform agent, an exhaust pipe arranged below said support in said passageway and provided with an inlet, and a hollow cylinder provided with longitudinal slots in its periphery and extending across and adapted to rotate over the top of the shaft.

3. An apparatus for distributing pieces or scales of mica or other material, comprising a vertical shaft with closed walls, a car for entering said shaft and a door in a wall of the shaft for admitting said car, the top of the car consisting of a platform pervious to an aeriform agent, and an exhaust pipe carried by the car, and having an inlet opening.

4. An apparatus for distributing pieces or scales of mica or other material, comprising a vertical shaft with closed walls, a car for entering said shaft and a door in a wall of the shaft for admitting said car, the top of the car consisting of a platform pervious to an aeriform agent, and an exhaust pipe carried by the car, and having an inlet opening, and an extension for attachment to an exhaust apparatus.

5. An apparatus for distributing pieces or scales of mica or other material, comprising a vertical shaft with closed walls, a car for entering said shaft and a door in a wall of the shaft for admitting said car, the top of the car consisting of a platform pervious to an aeriform agent, an exhaust pipe carried by the car, and having an inlet opening, an inlet pipe of an exhaust apparatus and means for attaching the car pipe to said inlet pipe.

6. An apparatus for distributing pieces or scales of mica or other material, comprising a vertical shaft with closed walls, a car for entering said shaft and a door in a wall of the shaft for admitting said car, the top of the car consisting of a platform pervious to an aeriform agent, an exhaust pipe carried by the car, and having an inlet opening, an inlet pipe of an exhaust apparatus, means for attaching the car pipe to said inlet pipe, and a valve in said pipe.

7. An apparatus for distributing pieces or scales of mica or other material, comprising a vertical shaft with closed walls, a platform arranged transversely in said shaft and pervious to an aeriform agent, means for supporting said platform in said shaft, a door in the wall of said shaft for permitting the withdrawal of the platform from and the insertion of the same within the shaft, and means for passing an aeriform agent down through said shaft and platform.

8. An apparatus for distributing pieces or scales of mica or other material, comprising a vertical shaft with closed walls, a platform arranged transversely in said shaft and pervious to an aeriform agent, means for supporting said platform in said shaft, and having guide ways for the same, a door in the wall of said shaft for permitting the withdrawal of the platform from and the insertion of the same within the shaft, and means for passing an aeriform agent down through said shaft and platform.

9. In an apparatus for treating and distributing mica scales and the like, a suitable support on which the scales are to be distributed and a rotatable receptacle forming a hopper for the scales, said receptacle having slits or oblong openings extending longitudinally with its axis through which the scales are thrown out of the receptacle.

10. In an apparatus for treating and distributing mica scales and the like, a suitable support on which the scales are to be distributed and a rotatable traveling receptacle forming a hopper for the scales, said receptacle having slits or oblong openings extending longitudinally with its axis through which the scales are thrown out of the receptacle.

11. In an apparatus for treating and distributing mica scales and the like, a suitable support on which the scales are to be distributed, and means for distributing the scales upon said support, said means including a movable receptacle for the scales and means for giving said receptacle suitable motion to distribute the scales, said receptacle having slits or oblong openings through which the scales are thrown out of the receptacle.

12. In an apparatus for treating and distributing mica scales and the like, a suitable support on which the scales are to be distributed, means for leveling the scales upon said support by pneumatic pressure, and a slitted receptacle forming a hopper for the scales and means for rotating said receptacle to separate the scales therein and distribute them upon said support.

13. In an apparatus for treating and distributing mica scales and the like, a suitable support on which the scales are to be distributed, means for leveling the scales upon said support by pneumatic pressure, and means for distributing the scales upon said support, said means including a slitted movable receptacle for the scales and means for giving said receptacle suitable motion to distribute the scales.

14. In an apparatus for treating and distributing mica scales and the like, a suitable support on which the scales are to be distributed, means for leveling the scales upon said support by pneumatic pressure, and a rotatable receptacle forming a hopper for the scales, said receptacle being slotted longitudinally with its axis, through which slits the scales are thrown out of the receptacle.

In testimony whereof, I have signed my name to this specification, in the presence of two subscribing witnesses.

CHARLES W. JEFFERSON.

Witnesses:
D. VEDDER CLUTE,
ANNA DE GRAFF.